Dec. 6, 1938.     C. T. FESSLER     2,139,329

WEATHER STRIP

Filed April 15, 1936

INVENTOR.
Charles T. Fessler
BY Barnes, Kisselle, Laughlin & Raisch
ATTORNEY.

Patented Dec. 6, 1938

2,139,329

UNITED STATES PATENT OFFICE 2,139,329

WEATHER STRIP

Charles T. Fessler, Detroit, Mich., assignor to General Motors Corporation, Detroit, Mich., a corporation of Delaware Application April 15, 1936, Serial No. 74,487

13 Claims. (Cl. 296—44.5)

This invention relates to a weatherstrip assembly, and more particularly to a weatherstrip adapted for sealing a vehicle door.

It is the object of this invention to produce a weatherseal which can be easily assembled to, or disassembled from, its support, and which efficiently seals the door against the weather.

Figure 3:
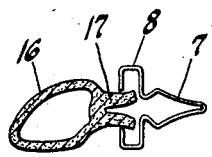
Figure 4:
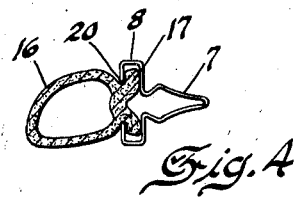
Figure 5:
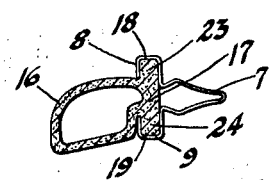

Figs. 3, 4, and 5 illustrate one of the methods of interengaging the weatherstrip with one of its retaining clips.

Figure 6:
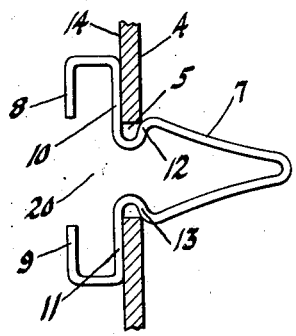

Fig. 6 is an enlarged detail of the clip mounted on its support.

Figure 7:
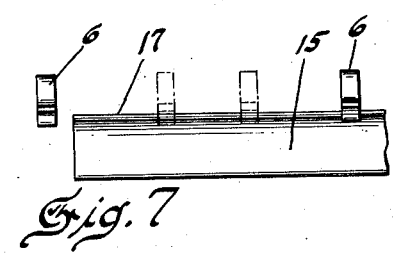

Fig. 7 shows another method for interengaging the weatherstrip with its retaining clips.

Figure 8:
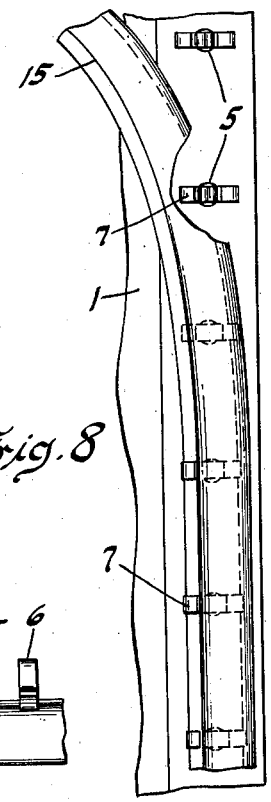

Fig. 8 shows the weatherstrip being secured to the door.

Referring more particularly to the drawing there is shown an automotive vehicle having the usual hinged door 1 for closing the door opening 2. A portion of the door opening 2 is defined by the center pillar 3. The door may be sealed in the door opening along its entire periphery or merely along one or more of its sides. This invention is concerned with a door seal for sealing one or more of the edges of the door and may be carried by either the door or the door jamb.

As herein illustrated for descriptive purposes only, the weatherstrip is shown carried by the door 1. To this end the door pillar 4 is provided with a plurality of spaced openings 5 along the side or sides of the door which it is desired to seal. Each of these openings is provided with a spring clip 6.

Fig. 6 is an enlarged showing of the spring clip 6. The spring clip 6 is formed from a flat strip of spring steel folded back upon itself intermediate its ends to form a V or arrow-shaped head 7. The ends are shaped to form opposed U channels 8 and 9, the inside walls 10 and 11 of which are arranged to seat against the outside face 14 of the pillar 4. Between the head 7 and the channels 8 and 9 the clip 7 is provided with inclined shoulder portions 12 and 13 which form acute angles with the walls 10 and 11 respectively of the U portions 8 and 9. The head 7 of the clip when unconfined is wider than the opening 5 in the pillar 4. Consequently when the clip head 7 is compressed, passed through and interengaged with the opening 5, the head 7 is under spring tension which urges the inclined shoulder portions 12 and 13 apart. Thus, the inclined portions 12 and 13, due to the tensioning of the head 7 of the spring clip, tend to cam the inside walls 10 and 11 of the U channels tightly against the outer face 14 of the pillar 4. The inclined shoulders 12 and 13 also project beyond the circumference of the openings 5 on the inside of the pillar and thus removably interlock the spring clip in the opening 5.

The spring clip 6 is arranged to receive a weatherstrip 15 of any suitable material, such as rubber. Preferably the weatherstrip is formed with a hollow or tubular portion 16 and a base portion 17. The base portion 17 takes the form of a flat strip which is preferably homogeneously formed with the hollow tubular portion 16 or otherwise fixed to the tubular portion 16 between its longitudinal edges 18 and 19 to provide shoulders 23 and 24 for interengagement with the U portions 8 and 9 of the spring clip.

In the assembly of the weatherstrip 15 to the door pillar, the clips 6 may be first snapped into the openings 5, as shown in Fig. 8, and the weatherstrip 15 then interengaged with the clips to secure the same to the door, or the clips may first be secured to the weatherstrip and then snapped into the opening 5 in the door to secure the weatherstrip and clips to the door.

The weatherstrip 15 can be interengaged with the clips according to various methods either before or after the clips are engaged in opening 5. One method is illustrated in Figs. 3, 4 and 5. According to this method the base of the weatherstrip is bent back upon itself intermediate its ends by hand or a suitable tool, as shown in Fig. 3; and then passed through the mouth 20 of the clip whereupon the base 17 is released so that it straightens out to its original form as shown in Figs. 4 and 5. Another method for interengaging the weatherstrip 15 with the clips 6 is shown in Fig. 7. In this case the clips 6 may be expanded slightly and slid on to the end and along the base 17 of the weatherstrip and thus properly spaced one from the other.

Still another method is that the clips may be first snapped into the openings 5 and then the weatherstrip slid lengthwise so that its base 17 is passed through the eyes of the clips 6, the eyes being formed by the opposed U portions 8 and 9.

Figure 1:
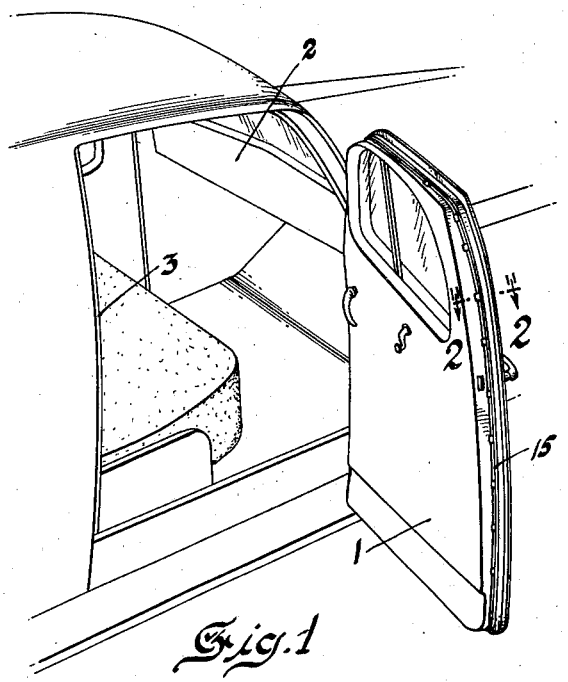
Fig. 1 is a perspective view showing a portion of an automobile with the door open and the weatherstrip secured thereto.
Figure 2:
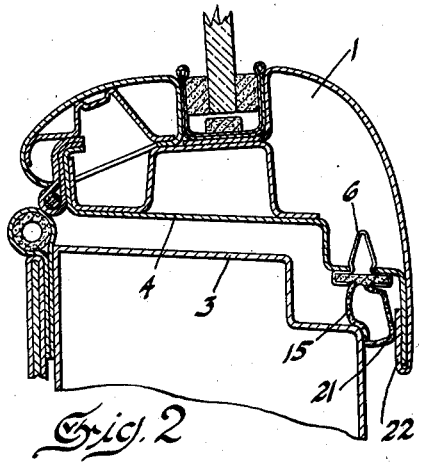
Fig. 2 is a section through the door and the door pillar showing the weatherstrip in sealing position between the door and the door jamb.

The base 17 of the weatherstrip preferably is formed so that it is somewhat larger than the eye of the clip formed by the U portions 8 and 9 when the clip is mounted in the openings 5 of the support 4. Therefore, the base 17 when interengaged between the U portions 8 and 9, as shown in Figs. 2 and 5, is distorted or compressed thereby exerting an outward pressure against the clip tending to open the clip, that is, urge the cam shoulders 12 and 13 further apart. This, as explained above, reinforces the spring tension of the clip itself and causes the cam shoulders 12 and 13 to act against the edges of the openings 5 to draw the walls 10 and 11 more tightly against the support 4 and better secure the clip in the opening 5.

After the weatherstrip has been secured by the clips 6 to the door pillar 4 in some cases the side wall of the hollow portion 16 may, if desired, be cemented as at 21 to the door overlap flange 22.

I claim:

1. In a weatherstrip assembly comprising in combination a support having one or more openings therein, a weatherstrip including a base portion adapted to extend along the said support and a sealing portion secured to the base portion between its longitudinal edges to form shoulders and one or more spring clips having a head portion arranged to be passed through and yieldably interengage the openings in the said support, the said clips being provided with opposed socket portions for receiving the base of the said weatherstrip, the said socket portions interengaging the shoulder of the said base of the weatherstrip on opposite sides of the sealing portion of the weatherstrip.

2. In a weatherstrip assembly comprising in combination a support having one or more openings therein, a weatherstrip including a base portion adapted to extend along the said support and a sealing portion secured to the base portion between its longitudinal edges to form shoulders and one or more spring clips having a head portion arranged to be passed through and yieldably interengage the openings in the said support, the said clips being provided with opposed socket portions for receiving the base of the said weatherstrip, the said socket portions interengaging the shoulder of the said base of the weatherstrip on opposite sides of the sealing portion of the weatherstrip, the base of the weatherstrip being wider than the distance between the socket members when the spring clip is interengaged with the opening in the support whereby the base member is placed under compression and yieldably holds the clip member into interengagement with the opening in the support.

3. In a weatherstrip assembly comprising the combination of a support having one or more openings therein, a weatherstrip including a resilient base portion adapted to extend along the support and a sealing portion extending along the base portion, one or more spring clips having a head portion adapted to be passed through and yieldably interengaging the openings in the said support, the said clips having opposed socket portions for receiving and holding under compression the base of the said weatherstrip whereby the tension of the compressed base urges the clip into interengagement in the opening in the support.

4. In a weatherstrip assembly comprising in combination a support having one or more openings therein, a weatherstrip including a base portion adapted to extend along the said support and a sealing portion secured to the base portion between its longitudinal edges to form shoulders and one or more spring clips having a head portion arranged to be passed through the openings in the said support and a pair of opposed socket portions for receiving the base of the weatherstrip and a pair of inclined shoulders intermediate the socket portion and the head portion for yieldably interengaging the opening in the said support and camming the socket portions against the outside face of the support, the said resilient base being interengaged with, and compressed by, the said sockets whereby the expansion force of the base supplements the spring tension of the clip to yieldably interengage the clip in the opening in the support.

5. In a weatherstrip assembly comprising in combination a support having one or more openings therein, a weatherstrip including a resilient base portion adapted to extend along the said support and a sealing portion secured to the base portion between its longitudinal edges to form shoulders and one or more spring clips having a head portion arranged to be passed through the opening in the said support and a pair of opposed U members for receiving the base of the weatherstrip and a pair of inclined shoulders intermediate the socket portion and the head portion for yieldably interengaging the opening in the said support and camming the socket portions against the outside face of the support, the said resilient base being interengaged with, and compressed by, the said sockets whereby the expansion force of the base supplements the spring tension of the clip to yieldably interengage the clip in the opening in the support.

6. In a weatherstrip assembly comprising in combination a support having one or more openings therein, a weatherstrip including a base portion adapted to extend along the said support and a sealing portion secured to the base portion between its longitudinal edges to form shoulders and one or more spring clips having a head portion arranged to be passed through the opening in the said support and a pair of opposed U members forming a socket of less size than the resilient base for receiving and compressing the resilient base and a pair of inclined shoulders intermediate the socket portion and the head of the spring clip for yieldably interengaging the opening in the said support and camming the socket portions against the outside face of the support, the said resilient base being interengaged with, and compressed by, the said sockets whereby the expansion force of the base supplements the spring tension of the clip to yieldably interengage the clip in the opening in the support.

7. In a weatherstrip assembly comprising in combination a support having one or more openings therein, a rubber weatherstrip including a base portion adapted to extend along the said support and a sealing portion secured to the base portion between its longitudinal edges to form shoulders and one or more spring clips having a head portion arranged to be passed through the opening in the said support and a pair of opposed U members forming a socket of less size than the rubber base for receiving and compressing the rubber base, and a pair of inclined shoulders intermediate the socket portion and the head of the spring clip for yieldably interengaging the opening in the said support and camming the socket portions against the outside face of the support, the said rubber base being interengaged with, and compressed by, the said sockets whereby the expansion force of the base supplements the spring tension of the clip to yieldably interengage the clip in the opening in the support.

8. In a weatherstrip assembly comprising in combination a support having one or more openings therein, a rubber weatherstrip including an elongated flat base portion adapted to lie along the said support and a sealing portion secured to the base portion between its longitudinal edges to form shoulders and one or more spring clips formed from a single strip of spring metal bent back upon itself between its ends and having a head portion adapted to be passed through the opening in the support and a pair of inclined diverging shoulders arranged to engage the inside face of the said support along the periphery of the said opening, the said clip also including a pair of U shaped ends positioned one on each side of the said opening against the outside face of the said support, the said U shaped ends interengaging the shoulders of the said base one on each side of the sealing portion of the rubber weatherstrip and compressing the base of the rubber weatherstrip therebetween whereby the expansive force of the base of the weatherstrip cooperates with the inclined cam shoulders of the spring clip to better interengage the clip in the opening of the said support.

9. The method of mounting a weatherstrip on a support having a plurality of spaced sockets comprising interengaging a plurality of spring clips with the said spaced sockets in the support, thereafter distorting the said weatherstrip successively at spaced intervals to interengage the weatherstrip with one after the other of said spring clips and retaining the said weatherstrip under compression whereby the weatherstrip yieldably retains the spring clip in interengagement with the said socket.

10. The method of weatherstripping a support with an elongated resilient weatherstrip comprising forming a plurality of spaced sockets along the said support, interengaging an expansible spring clip having a socket portion in each of the said sockets, thereafter compressing the base of the weatherstrip member successively at spaced points while passing it laterally into the clip sockets one after the other and then releasing the pressure to permit the base to expand to fill out the socket member and resiliently hold the clip in interengagement with the socket and the support.

11. The combination with a resilient mounting strip and a support having spaced apertures for receiving retaining means for the strip to secure said strip to the said support, of retaining means connected to the strip and received in said apertures, said retaining means comprising a spring metal clip having divergent leg portions adapted to be inserted and sprung through the apertures endwise and having head portions movable relative to each other by flexing of said clip as the legs are inserted through the said apertures, said head portions tightly embracing the resilient strip for connecting the strip to the clip consequent upon said insertion, and said strip yieldably urging said head portions relatively apart whereby the legs are spread after insertion, and shoulders on the legs adjacent and spaced from the head for engaging the surface of the support at the face opposite to the head portions.

12. The combination with a resilient strip and a support having spaced apertures for receiving retaining means for securing the strip to the support with a face portion of the strip adapted to lie along said support, of spring clip retaining means connected to the strip and receivable in said apertures, respectively, each of said spring clips comprising a single strip of spring metal having a nose portion and leg portions divergent therefrom toward their opposite ends, and adapted to be inserted and sprung through an associated one of the apertures with the nose portion foremost and having head portions at the said opposite ends, which head portions are movable relative to each other by flexing of said clip as the leg portions are inserted through the associated aperture, said strip having a portion yieldably engaging between said head portions and coacting therewith during insertion of the clip through the aperture for yieldably urging the head portions relatively apart, whereby the strip assists in clamping the clip in fixed position on the strip, said strip being tightly engaged by the head portions after insertion for connecting the strip to the clip and thereby to the support, and shoulders on the legs adjacent and spaced from the head portions for engaging the surface of the support at the face opposite to said head portions.

13. In combination, a resilient weather strip having a resilient base portion and a laterally contracted resilient neck portion between the base portion and the remainder of the strip, and a support having one or more spaced apertures for receiving retaining means of the strip to secure the strip to the support, of spring clip retaining means connected to the strip and received in said apertures, respectively, each of said spring clips comprising a single strip of spring metal having a nose portion intermediate its ends and leg portions divergent therefrom and adapted to be inserted and sprung through an associated aperture with the nose portion foremost, said leg portions having integral head portions at their divergent ends which are movable relative to each other by flexing of the clip as the leg portions are inserted through the associated aperture, said head portions accommodating the base portion of said strip therebetween, and the free ends of said head portions engaging the neck portion of the strip, said head portions being yieldably urged apart by said strip during insertion of the clip through the aperture and said strip being tightly clamped by said head portions after insertion of the clip, and shoulders on the leg portions adjacent and spaced from the head portions for engaging the surface of the support at the face opposite to the head portions.

CHARLES T. FESSLER.